April 26, 1960 — J. L. WORTH — 2,934,495
METHOD AND APPARATUS FOR CONVERSION OF ORGANIC REACTANTS
Filed Aug. 22, 1958

INVENTOR.
JOHN L. WORTH
BY Robert O. Spindle
ATTORNEY

United States Patent Office 2,934,495
Patented Apr. 26, 1960

2,934,495

METHOD AND APPARATUS FOR CONVERSION OF ORGANIC REACTANTS

John L. Worth, Wilmington, Del., assignor to Sun Oil Company, Philadelphia, Pa., a corporation of New Jersey Application August 22, 1958, Serial No. 756,721

11 Claims. (Cl. 208—176)

In United States Patent No. 2,704,741, issued March 22, 1955, there is illustrated and described a novel type of converter in which fluid organic reactants are converted to other organic products by contact with a catalyst, and with which the catalyst, by contact with other fluids, is periodically regenerated for contact with later supplies of fluid organic reactants. The invention described in that patent is especially applicable, though not limited, to conversion by catalysis of higher hydrocarbons to mainly lower boiling hydrocarbons, as in the well known petroleum oil cracking plants.

In this illustrative process, after such catalytic conversion, the catalyst is purged by a suitable fluid, then regenerated by a suitable reactant, and again purged by a suitable fluid, thus completing the cycle and reconditioning the catalyst for conversion of higher boiling hydrocarbons to mainly lower boiling hydrocarbons.

This process has been widely used commercially for many years, and has been practiced in what are known as the fixed bed process, the moving bed process and the fluid catalyst process.

The converter disclosed in said patent is of a type entirely different from those in commercial use and different also other proposed converters in that it embodies certain features of novelty and importance that adapt it to successful commercial use.

The subject matter of this application is an improvement on the type of converter disclosed in said patent. Such converter comprises a fixed outer cylindrical casing, a fixed inner cylindrical casing, an annular rotatable reaction vessel between the two casings and spaced from both to form inner and outer circumferential spaces, partitions in the inner casing dividing its interior into sections, vertically and circumferentially extending inner and outer seals between the rotatable reaction vessel and the inner and outer casing, the inner seals dividing the inner circumferential space into independent arcuate spaces communicating with the respective sections, the outer seals dividing the outer circumferential space into independent arcuate spaces paired with the inner independent arcuate spaces, and a multitude of catalyst-containing compartments, preferably but not necessarily in the form of tubes, extending radially or transversely through the reaction vessel and having inner inlets and outer outlets which, in the rotation of the reaction vessel, afford communication between successive pairs of inner and outer arcuate spaces.

In this converter, fluid organic reactants are introduced into at least one of the inner arcuate spaces, and are passed therefrom through the catalyst-containing compartments. Upon contact with the catalyst, the fluid organic reactants are converted to other organic products, which emerge from the catalyst-containing compartments into the outer arcuate spaces, and are subsequently removed therefrom. This process is continuous, and during the continuous passage of the fluid organic reactant, the annular rotatable reaction vessel is continuously rotated, so that additional catalyst-containing compartments are brought into communication with the inner arcuate space containing the fluid organic reactant, while those in communication with this inner arcuate space are moved to communication with the succeeding arcuate space. In the conversion of higher boiling hydrocarbons to lower boiling hydrocarbons, a purging fluid, such as steam, is introduced into the succeeding inner arcuate space, in order to purge converted and unconverted fluid reactants from the catalyst-containing compartments. The next inner arcuate space contains a regenerating medium, such as high temperature air, to burn off deposited coke and prepare the catalyst for additional contacting by fluid organic reactants. This is followed by another inner arcuate space which supplies additional purging fluid to remove products of the regeneration.

It has been found that a relatively large volume of high temperature, e.g., 900° F., air is required to insure adequate combustion of the deposited coke during the regeneration portion of the cycle, without overheating of the catalyst. Generally the catalyst cannot be exposed to temperatures above about 1200° F., since higher temperatures cause deactivation of the catalyst. Furthermore, relatively high temperature air, e.g., at least about 900° F. must be used in order to initiate and insure substantially complete combustion of the deposited coke. The allowable temperature differential between the inlet air and effluent air containing gaseous regeneration products is therefore limited to about 300° F., and relatively large quantities of air are required to maintain the temperature differential within this range. The illustrative catalytic cracking process is exothermic overall (hydrocarbon conversion plus catalyst regeneration), consequently a large amount of heat must be removed in order to maintain the heat balance of the converter. In many instances the capacity of the converter is limited by the amount of heat which can be removed, i.e., the amount of air which can be used for cooling and regeneration.

A method has now been discovered whereby inlet air at a much lower temperature may be used, thus increasing the heat removal per pound of air, and resulting in a considerable reduction in the amount of air required for regeneration. This is achieved by providing an additional inner arcuate space in the fixed inner cylindrical casing, this additional inner arcuate space being situated between the inner arcuate space for the first purging fluid and the inner arcuate space which supplies the regenerating medium, such as air. Relatively low temperature air is used, and is passed through the rotating catalyst bed and into the outer arcuate space provided for the removal of the air containing gaseous regeneration products. This effluent is not removed, however, but is again passed through the rotating catalyst bed and into the additional inner arcuate space, from which it is exhausted. Thus this reverse flow of air serves to initiate combustion of the deposited coke, and the combustion is continued during contacting with the relatively low temperature air on its first pass through the catalyst.

The description of the process of this invention and apparatus for performing the process is facilitated by reference to the attached drawings, wherein.

Figure 1:
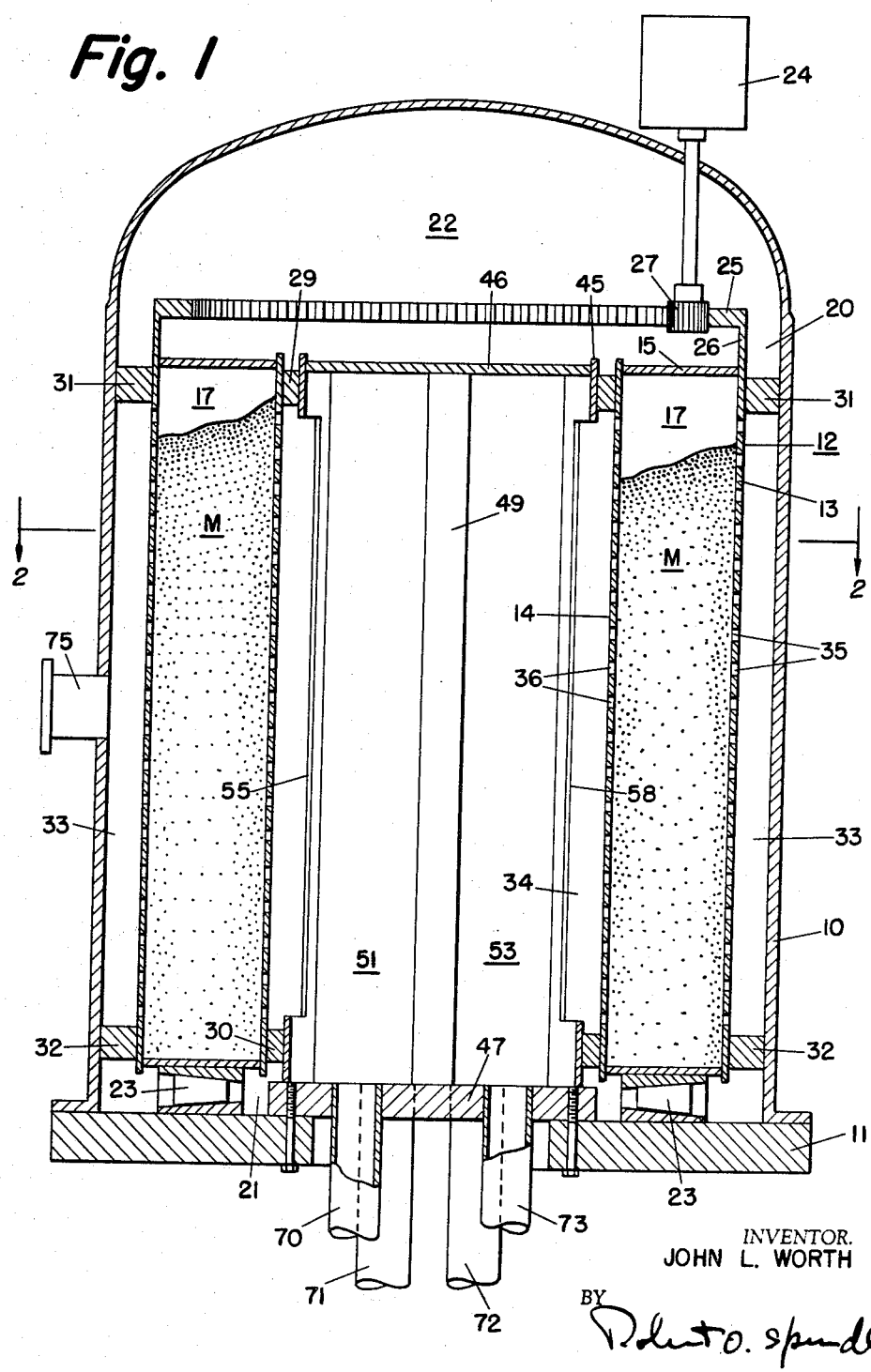
Figure 1 is a vertical sectional view of the reactor, taken on the line 1—1 of Figure 2.

Referring now to Figure 1, 10 indicates an outer cylindrical casing which is suitably fixed, as by flanging, to a supporting head 11. The casing 10 is made pressure tight and encloses a vessel which contains the catalyst or contact material as well as the apparatus forming the fluid compartments for the supply of the different starting fluids to the vessel and the removal of different products from the vessel and also some of the elements for effecting rotation of the vessel.

The vessel 12 which contains the catalyst or contact material is annular in shape and formed by an outer cylindrical sidewall 13 and an inner cylindrical sidewall 14 which are concentric one with another and are interconnected by annular end plates 15 and 16, respectively. Vessel 12 is divided by vertical partitions 17, as more clearly seen in Figure 2, into a plurality of transversely extending contact material chambers 18. Each of these contact material chambers is substantially filled with a contact material M.

The vessel 12 and associated elements form an assembly which is disposed within the casing 10 to provide an outer annular space 20 with its sidewall, a lower space 21, with the supporting head 11, and an enlarged space 22 with the upper end of the casing and with the inner sidewall 14 of the reaction vessel. A set of rollers 23 are provided within the lower space 21 to rotatably support the vessel 12 which is driven by a motor 24 suitably connected through a pinion 27 to a ring-gear 25, formed on extension 26, at the upper end of the reaction vessel sidewall 13.

The space 20 is divided by circumferential seals, comprising a pair of circular blocks 31 and 32 positioned in spaced relation to form therebetween an outer annular fluid zone 33 while the space 22 is similarly divided by circumferential seals comprising circular blocks 29 and 30, positioned in spaced relation to form an inner annular fluid zone 34 therebetween. The fluid zones 33 and 34 communicate with each other through apertures 35 and 36 formed in the vessel's outer and inner walls, respectively, so that fluid reactants supplied to one of the zones may pass through the contact material M in the vessel 12 and the products thereof removed from the other zone.

Figure 2:
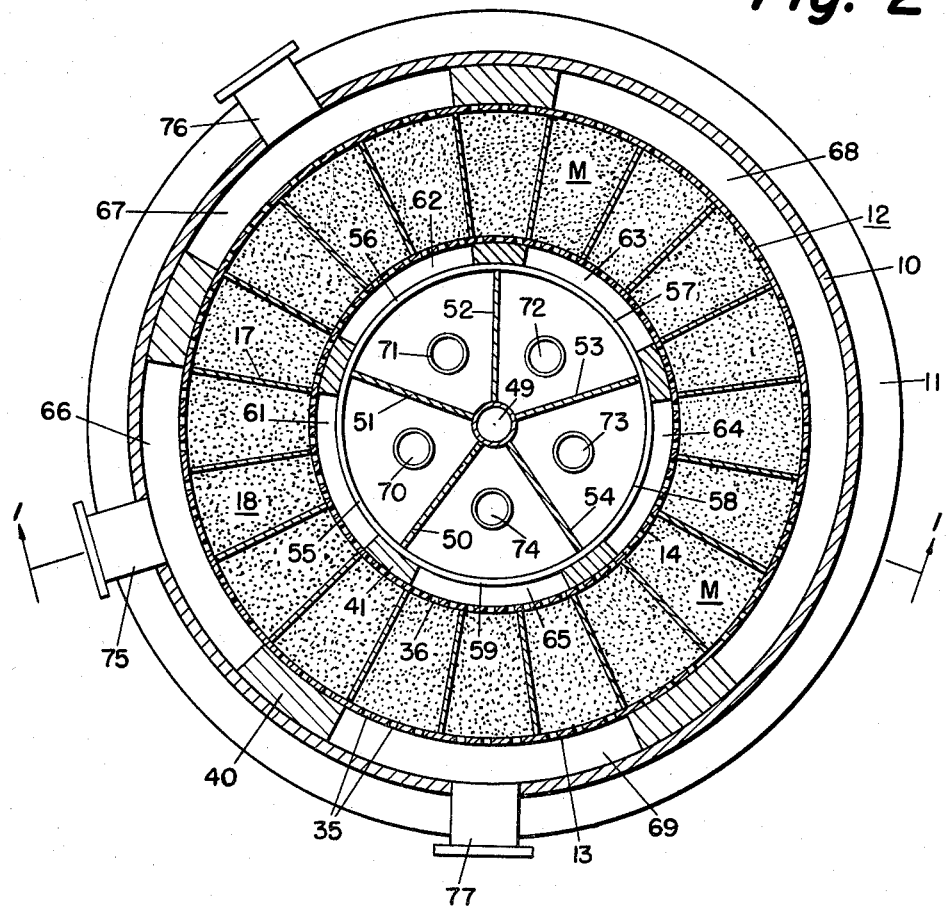
Figure 2 is a horizontal cross-sectional view of the reactor, taken on the line 2—2 of Figure 1.

In Figure 2 the outer fluid zone 33 is further divided by a plurality of vertical seals, comprising spaced elongated blocks 40, to form spaced outer arcuate compartments therein, and the inner fluid zone 34 is divided by vertical seals 41, comprising similar blocks, to form spaced inner arcuate compartments.

Since the function of the circumferential and vertical seals is to provide a set of inner fluid compartments which are separate and independent and a set of outer fluid compartments which are separate and independent, the particular construction and manner of joining the cooperating seals may be such as to effect this result and hence no specific construction of the seals is considered necessary. However, an operative seal is described in the hereinbefore referred to Patent No. 2,704,741, and other operative seals are described in United States Patent Nos. 2,715,567; 2,715,568; 2,715,569; and 2,715,570.

An inner cylindrical casing 45 having end walls 46 and 47 is positioned within the enlarged space 22 concentrically with casing 10, and is provided with a plurality of radial partitions 50, 51, 52, 53 and 54, shown clearly in Fig. 2, which extend between the ends 46 and 47 of the inner casing and have their inner edges secured to a central post 49 and their outer edges secured to a central post 49 and their outer edges secured to the inner wall of casing 45, dividing the casing into independent sections. Each radial partition is aligned with an inner vertical seal as indicated, in order to divide the casing into a number of sections equal to the number of these seals. Between the adjacent partitions, openings 55, 56, 57, 58 and 59 are provided in the casing 45, placing the sections in communication with inner compartments 61, 62, 63, 64 and 65 formed in the inner fluid zone 34 between the vertical seals 41. Inner compartments 61, 62, 63, 64 and 65 will be in communication through openings 35 and 36 with outer compartments 66, 67, 68 and 69, formed between outer vertical seals 40. Note that five inner compartments are provided, whereas there are only four outer compartments. Inner compartments 61, 62 and 65 form pairs of compartments with outer compartments 66, 67 and 69, respectively, whereas outer compartment 68 is sufficiently long to be opposite both the inner compartments 63 and 64.

Conduits indicated at 70, 71, 72, 73 and 74 are provided within the different sections formed in casing 45 for supplying fluids to or removing fluids from inner compartments 61, 62, 63, 64 and 65, respectively, and conduits 75, 76 and 77 are provided for supplying fluids to or removing fluids from outer compartments 66, 67 and 69, respectively.

In order to prevent the different fluids in adjacent inner compartments from entering any one catalyst chamber at the same time the inner vertical seals will be at least as wide and preferably slightly wider than the inner end of each of the transversely extending contact material chambers 18, and similarly the outer vertical seals will be at least as wide and preferably slightly wider than the outer end of each of the transversely extending contact material chambers 18. From an inspection of Figure 2 it will be seen that as the vessel 12 is rotated seals 40 and 41 will cover the openings 35 and 36 of one chamber 18 so that any chamber 18 formed between the adjacent vertical partitions 17 can only be in communication with one pair of cooperating inner and outer fluid compartments at any one time, since the vertical seals will at all times block off the fluids in the next adjacent pair of cooperating compartments. In other words, each contact material chamber will be completely blocked off before it is advanced or rotated to be in communication with the next pair of cooperating compartments.

The circumferential and vertical seals will preferably be made stationary with the stationary inner and outer casings 45 and 10 although if desired they may be arranged to rotate with the walls of vessel 12. In order to reduce frictional contact between the relatively rotating elements of the apparatus a suitable lubricating medium may be used and also the seals may be so designed as to take into account any strains or stresses due to expansion or contraction which may be caused by temperature variations during the operation of the apparatus.

The illustrated and described apparatus, although applicable generally to processes utilizing in succession a plurality of different fluids that contact with a catalyst or other contact material, such operation comprising a series of steps in sequence which are repeated indefinitely, lends itself particularly to the cracking or other treatment of petroleum hydrocarbons. For example, in the so-called "fixed-bed" catalytic plants, when applied to such cracking, a stationary catalyst mass is contacted, in sequence, first with a hydrocarbon fluid to form other and mainly lower boiling hydrocarbons; second, with a purge medium, such as steam, to remove from the catalyst hydrocarbon material remaining therein; third, with a regenerating medium, such as air, to remove carbon deposited on the catalyst during the first step; and fourth, with a purge medium to remove regeneration products formed during the third step.

The same sequence of steps characterizes the process described in U.S. Patent No. 2,704,741, and the present process, which is an improvement over the process described in the patent, in its preferred use for the conversion of hydrocarbons.

Referring to Figure 2, it will be seen that the vessel 12 is formed into a plurality of catalyst chambers 18 comprising a unit. From the unit a plurality of different groups of the chambers are selected and each group is contacted simultaneously with the above-mentioned fluids which will be distributed radially across the chambers of each group from either the inner or outer set of compartments. For example, in hydrocarbon conversion, oil vapors are supplied to compartment 61 for passage through the group of chambers located between compartments 61 and 66. A first purge fluid, e.g., steam, is supplied to compartment 62 for passage through the group of chambers located between compartments 62 and 67. Up to this point, the process is the same as that of the aforementioned Patent No. 2,704,741. According to the present invention, however, regeneration fluid, e.g., air, is supplied to compartment 64 for passage through the group of chambers located between compartments 64 and 68. The regeneration fluid, having passed through the catalyst bed into compartment 68, is now returned through the group of chambers located between compartments 68 and 63, and is removed from compartment 63 through opening 57 and conduit 72. A second purge fluid is supplied to compartment 65 for passage through the group of chambers located between compartments 65 and 69. The vessel 12 is rotated at some predetermined rate, and for the purpose of this description, in a clockwise direction, so that the chambers of each group will successively advance until the contact material in each chamber has been contacted with each of the different fluids, and then a new cycle of operation will begin.

According to the present invention a relatively low temperature regenerating fluid is admitted to compartment 64. Air is the preferred regenerating fluid, although other oxygen-containing gases, preferably containing at least 10% oxygen by weight, whose other components do not react with the contact material may also be used. The regenerating fluid is introduced at a temperature of from atmospheric up to about 700° F., and preferably at from about 200° F. to about 500° F. During passage from compartment 64 to compartment 68, the air is heated by the hot contact material, and in turn serves to cool the contact material to some extent. In addition, oxygen in the air supports combustion of any coke remaining on the contact material. The air is supplied at a space rate sufficient to lower the temperature of the contact material by a predetermined amount, and also to supply sufficient oxygen for substantially complete combustion of the deposited coke.

Upon passage into compartment 68, the heated air is passed through the group of chambers located between compartments 68 and 63. During its initial passage through the contact material, the air has been heated sufficiently to initiate combustion of the deposited coke during its second passage. The air is then further heated by the combustion of the coke during this second passage, and passes into compartment 63 at a temperature preferably from about 1150° F. to 1200° F. Under certain conditions lower temperatures, down to about 1000° F., may be desirable, and higher temperatures may be used where the particular contact material and materials of construction allow it. Thus, by the improvement of this invention, the temperature differential of the regeneration fluid is increased from the former 300° F. maximum to 1000° F. or more. Furthermore, the oxygen in the regeneration fluid is utilized more efficiently. Formerly only from about 5% to about 20% of the oxygen in air was consumed in combustion of the coke, whereas by the improvement of this invention up to 50% or more of the oxygen may be utilized.

The following comparison of the heat removal obtained by the previous single pass method and that obtained by the present double pass method effectively illustrates the superiority of the present method in that respect:

| Air Temperature °F. | | Heat Removal, B.t.u./# Air | |
|---|---|---|---|
| Outlet | Inlet | Single Pass | Double Pass |
| 1,150 | 900 | 62 | 62 |
| 1,150 | 650 | ------ | 124 |
| 1,150 | 300 | ------ | 212 |

The single pass process cannot be operated at inlet air temperatures substantially below 900° F., since such lower temperatures will not initiate combustion of the coke at a practical rate.

Another important advantage of the present system is that more uniform catalyst bed temperatures are maintained, since in one pass of the air, the cooler air contacts the radially inward portion of the catalyst, and in the other pass the cooler air contacts the radially outward portion of the catalyst. This allows the maintenance of a higher average temperature in the catalyst bed without fear of overheating portions of the catalyst, and consequently results in a more efficient use of the regeneration zone, since more coke can be burned per unit volume.

Figure 3:
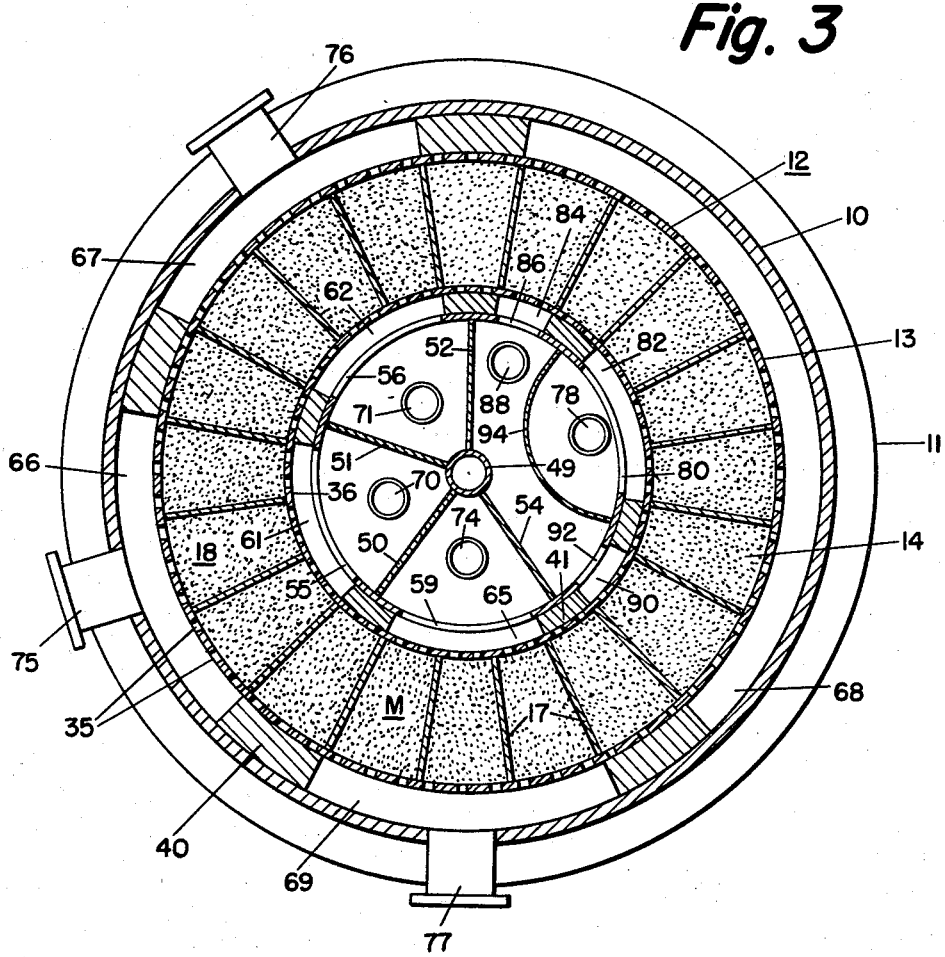
Figure 3 is a horizontal cross-sectional view of another embodiment of the reactor of this invention, taken on line 2—2 of Figure 1.

Figure 3 depicts another embodiment of the invention, wherein the regeneration fluid first contacts the contact material in the center of the regeneration zone, then a portion of the heated air is returned through the catalyst bed as in the embodiment of Figure 2, while the remainder of the heated regeneration fluid is returned on the other side of the regeneration fluid inlet, so that the contact material is swept by hot gases immediately before leaving the regeneration zone. Thus in Figure 3 regeneration fluid is supplied through conduit 78 and opening 80 in casing 45 to compartment 82 and is passed through the group of chambers 18 located between compartments 82 and 68. A portion is then passed from compartment 68 through the group of chambers located between compartments 68 and 84 into compartment 84 and thence through opening 86 and out conduit 88. Another portion of the regenerating fluid is passed from compartment 68 through the group of chambers located between compartments 68 and 90 and thence through opening 92 and out conduit 88. Partition 94 separates the air inlet section from the air outlet section. In some instances it may be desirable to also separate the effluent regeneration fluid from compartments 84 and 90 and pass it through separate outlet conduits. Such structure would allow better control of the regeneration step.

This modification provides greater flexibility than that of Figure 2, in that the temperature of the contact material leaving the regeneration zone may be at a higher and more uniform temperature.

An additional advantage that results from the use of either of the modifications of this invention is that superheated steam could be used for purging the regeneration products from the contact mass. At present it is necessary to use low pressure saturated steam, since the purge material is also used to remove some heat from the contact mass and to reduce the range of temperatures prevailing in the contact mass. High temperature, superheated steam purges much more efficiently than does low pressure steam.

Many modifications of this invention will be apparent to those skilled in the arts. Several modifications of the reactor are described in the aforementioned patents, and it is obvious that the present invention can easily be applied to any of the modifications of the reactor which are described in those patents. The invention is therefore limited only as set forth in the appended claims.

The invention claimed is:

1. In a process which comprises rotating an annular reactor containing groups of contact material chambers, alternately passing a fluid organic reactant and a regenerating fluid radially through each of said groups of contact material chambers, and passing a purging medium through each group of chambers after each passage of fluid reactant and after each passage of regenerating fluid, the improvement which comprises introducing said regenerating fluid at a temperature insufficient to initiate combustion, and returning at least a portion of the regenerating fluid, which has been heated during the first-named passing to a temperature sufficient to initiate combustion, radially through said groups of contact material chambers after the passage of said fluid organic reactant and said purging medium and before the initial passage of said regenerating fluid.

2. In a process for converting hydrocarbons which comprises rotating an annular reactor containing groups of contact material chambers, alternately passing a fluid hydrocarbon reactant and contact material regenerating fluid from separate compartments of a fixed inner fluid zone through each of said groups of contact material chambers and into separate compartments of a fixed outer fluid zone, removing fluid hydrocarbon conversion products from said fixed outer fluid zone, and passing a purging medium through each group of chambers after each passage of fluid reactant and after each passage of regenerating fluid, the improvement which comprises introducing said regenerating fluid at a temperature insufficient to initiate combustion, and passing at least a portion of the contact material regenerating fluid, which has been heated during the first-named passing to a temperature sufficient to initiate combustion, in said fixed outer fluid zone back through the groups of contact material chambers after the passage of said fluid hydrocarbon reactant and said purging medium and before the initial passage of said regenerating fluid.

3. A process as defined by claim 2 wherein said regenerating fluid is air.

4. A process for converting hydrocarbons which comprises rotating an annular reactor containing groups of contact material containing chambers, introducing a fluid hydrocarbon reactant into a compartment of a fixed inner fluid zone within the inner wall of said annular reactor, introducing a regenerating fluid at a temperature in the range from room temperature to 700° F. into another compartment of said fixed inner fluid zone, successively contacting the contact material in each of said groups of chambers alternately with the fluid hydrocarbon reactant and the regenerating fluid by passing each of said fluids radially outwardly through said groups of chambers into separate compartments of a fixed outer fluid zone, whereby said fluid hydrocarbon reactant is converted to hydrocarbon conversion products and said regenerating fluid is heated to a temperature of at least 900° F., removing said hydrocarbon conversion products from one of said compartments, passing purging medium through each group of chambers after each passage of fluid reactant and after each passage of regenerating fluid, and passing at least a portion of said regenerating fluid radially inwardly through said groups of contact material containing chambers after each contacting of said contact material with said fluid hydrocarbon reactant and said purging medium and before each contacting of said contact material with the first-named regenerating fluid.

5. A process as defined by claim 4 wherein a portion of said heated regenerating fluid is passed radially inwardly through said groups of contact material containing chambers after each contacting of said contact material with the first-named regenerating fluid and before each contacting of said contact material with said fluid hydrocarbon reactant.

6. A rotary converter for fluid organic reactants which comprises a fixed outer cylindrical casing, a fixed inner cylindrical casing, an annular revoluble reaction vessel between the inner and outer casings and spaced from both to form inner and outer annular fluid zones, a plurality of transversely extending contact material chambers in said reaction vessel, means for revolving said reaction vessel, means dividing said inner annular fluid zone into a plurality of spaced inner arcuate compartments, means dividing said outer annular fluid zone into at least one less spaced outer arcuate compartment, each except one of said outer arcuate compartments being radially opposite one inner arcuate compartment, said one outer arcuate compartment being radially opposite the remainder of said inner arcuate compartments, means for supplying fluids to and removing fluids from each of said inner arcuate compartments, and means for supplying fluids to and removing fluids from each of said outer arcuate compartments except said one.

7. A rotary converter for fluid organic reactants which comprises a fixed outer cylindrical casing, a fixed inner cylindrical casing, an annular revoluble reaction vessel between the inner and outer casings and spaced from both to form inner and outer annular fluid zones, a plurality of transversely extending contact material chambers in said reaction vessel, means for revolving said reaction vessel, a plurality of spaced inner arcuate compartments in said inner annular fluid zone, at least one less spaced outer arcuate compartment in said outer annular fluid zone, each except one of which is radially opposite one inner arcuate compartment, said one outer arcuate compartment being radially opposite the remainder of said inner arcuate compartments, means for supplying fluids to and removing fluids from each of said inner arcuate compartments, and means for supplying fluids to and removing fluids from each of said outer arcuate compartments except said one.

8. A rotary converter as defined by claim 7 which has one less outer arcuate compartment than inner arcuate compartments.

9. A rotary converter as defined by claim 7 which has two less outer arcuate compartments than inner arcuate compartments.

10. In a rotary converter for fluid organic reactants which comprises a fixed outer cylindrical casing, a fixed inner cylindrical casing, an annular revoluble reaction vessel between the inner and outer casings, a plurality of transversely extending contact material chambers in said reaction vessel, means for revolving said reaction vessel, and means for alternately passing a fluid organic reactant and a regenerating fluid through each of said transversely extending contact material chambers, the improvement which comprises means for repassing said regenerating fluid through each of said contact material chambers after the passage of said fluid organic reactant and before the initial passage of said regenerating fluid, said means for repassing comprising a compartment in the outer casing, which compartment is in gaseous communication with said chambers only, and is adapted to receive regenerating fluid from a compartment of said inner casing through said chambers and to return regenerating fluid to another compartment of the inner casing through said chambers.

11. A rotary converter which comprises a revoluble reaction vessel having a plurality of chambers therein, a first set of fixed compartments in gaseous communication with said chambers, a second set of fixed compartments in gaseous communication with said chambers, said reaction vessel being disposed between the sets of compartments, the second set of compartments containing at least one less compartment than the first set, each except one of the second set of compartments being opposite one compartment of the first set, and said one compartment of the second set being opposite a plurality of compartments of the first set, means for supplying fluids to and removing fluids from each compartment of the first set, and means for supplying fluids to and removing fluids from each compartment of the second set except said one.

References Cited in the file of this patent

UNITED STATES PATENTS

| | | |
|---|---|---|
| 2,304,397 | Campbell | Dec. 8, 1942 |
| 2,466,005 | Crowley | Apr. 5, 1949 |
| 2,704,741 | Thayer | Mar. 22, 1955 |
| 2,739,928 | Thayer | Mar. 27, 1956 |